UNITED STATES PATENT OFFICE.

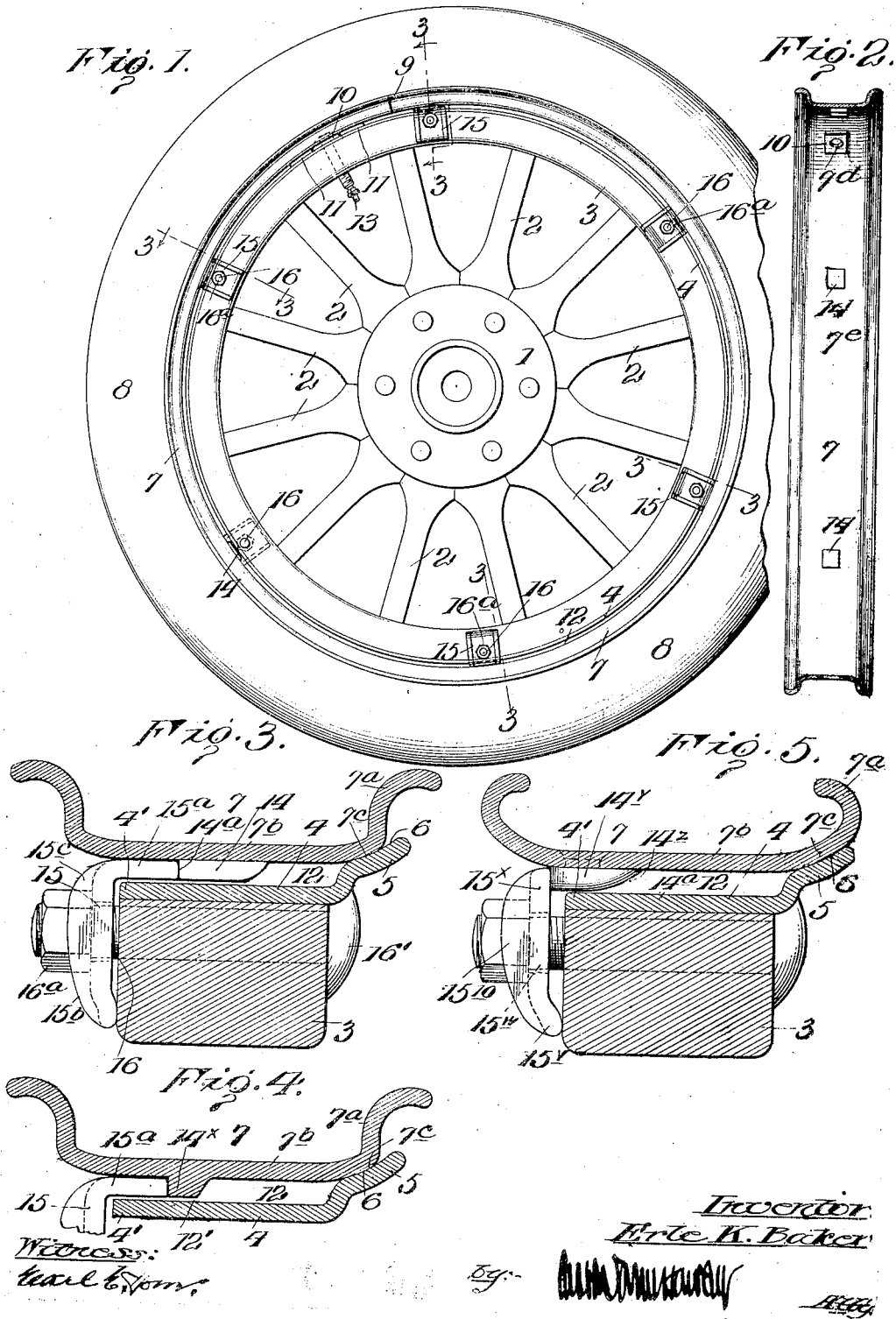

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE WHEEL-RIM.

1,314,933.  Specification of Letters Patent.  Patented Sept. 2, 1919.

Application filed April 10, 1916.  Serial No. 90,177.

*To all whom it may concern:*

Be it known that I, ERLE KING BAKER, a citizen of the United States, residing at Chicago, Cook county, Illinois, have invented certain new and useful Improvements in and for Demountable Wheel-Rims, of which the following is a specification.

My invention relates to demountable rim constructions for motor vehicle wheels that are equipped with tires which require changing from time to time.

It is the usual practice to put a pneumatic tire upon a demountable rim, and there inflate it before mounting the rim on the wheel of the motor vehicle. In event the tire is injured or deflated, the rim is demounted and is replaced by another, bearing an inflated tire; and the detaching of the injured tire from its rim, as well as the repairing of the tire, may be postponed.

The general objects of my invention will be made clear by the following statement of the problems and needs presented by the above defined practice.

The rim should be so made that it shall be easy to attach and detach the tire, particularly in the case of tires having inextensible base beads. The rim must be capable of safely and securely holding the tire, both when in service on the wheel and when being carried as an inflated "spare". The rim and wheel construction should be such that it shall be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained during service. Unless the demounting means responds to the above requirements the structure cannot be pronounced safe or desirable, and if the circularity, concentricity, and perpendicularity of the tire are not maintained, it will be found that the life of the tire is materially shortened. In addition to these requirements, it is essential that the construction shall be of the least weight consistent with the service to be performed, and it is commercially necessary that the costs of manufacture and maintenance shall be low. It is also extremely desirable that the construction shall be such that the rim may be mounted and demounted by the operation of few parts and in the least possible time.

For use with standard clencher tires which have base beads that may be stretched over its flanges, the rim may be of the integrally flanged endless type, and, to that extent, simpler than those required for tires having non-stretchable base beads. But in all other respects, the problems remain the same; for the matters of demountability, security, non-distortion, circularity, concentricity, and perpendicularity are of equal importance as to all tires.

The specific object of my invention is to provide a demountable wheel rim construction which shall be applicable to rims and tires of all types and which shall provide a complete solution for all of the above stated problems.

The general nature and principles of my invention, and also the details of the best embodiments thereof that I have thus far devised, will be readily understood on reference to the drawings that form part of this specification; and are particularly pointed out in the appended claims.

In the drawings, Figure 1 is an outer side elevation of a complete demountable rim construction embodying my invention;—Fig. 2 is a vertical cross section of the tire-carrying rim demounted from the wheel and without the tire;—Fig. 3 is a full sized cross section of the wheel felly and rim on any of the lines 3—3 of Fig. 1;—Fig. 4 illustrates a modification thereof;—and Fig. 5 discloses still another modification of my invention.

As shown in the drawings, 1 represents the wheel hub;—2 the radial spokes;—3 the wooden felly;—and, 4 the endless metal felly band or fixed rim, within which the felly and spokes are compressed as usual. The fixed rim, 4, is provided with a raised back flange, 5, which overhangs the inner side of the felly and presents an inclined surface or rim seat, 6, which is a frustum of a cone. The fixed rim may be secured on the felly in any suitable manner, as by the usual radial bolts or rivets (not shown). The outer edge, 4', of the fixed rim is preferably flush with the outer face of the felly.

Throughout the drawings, the demountable rim, whatever its specific kind, is marked 7; and, the tire, is marked 8. As will be clear from the several figures of the drawing, the demountable rim, 7, may be of clencher cross section or of straight-side cross section, according to the type of tire to be used therewith. A clencher section is shown in Fig. 5 and in that case the rim may be either endless or transplit. In Figs. 1, 2, 3, and 4 the rim is of the straight-side type having integral flanges, for use with straight-side tires; and, in consequence, the rim is transplit; as indicated at 9 in Fig. 1. It is to be understood that in both cases a suitable driving or anti-creeping connection is provided between the rim and the wheel. This driving connection may comprise a lug 10 on the rim 7 and spaced lugs 11, 11, on the fixed rim 4, as shown in Fig. 1. I have illustrated a variety of types of demountable rims in order that it may be clear that my invention is adaptable to all types.

Whatever its peculiar cross section, the rim is a relatively narrow, thin metal ring or cylinder, having outwardly extending tire-retaining flanges upon its ends or edges, as shown. I prefer that in every case the inner side-flange, $7^a$ whatever its form, shall be integral with the cylindrical body portion, $7^b$ of the rim. The junction, $7^c$, of the flange, $7^a$, and body, $7^b$, is known, and hereinafter will be referred to, as the inside corner of the rim. This corner, $7^c$, of the rim is circumferentially uniform and continuous; and, as shown in the sectional views, is complementary to the conical surface or seat, 6, on the raised back flange, 5. The rim, 7, is of greater circumference and diameter than the body $4^a$ of the fixed rim, 4; and, as shown, there is an annular space, 12, between the two rims. The back flange, 5, is positioned to receive and support the rim in concentric relation to the body of the fixed rim, 4. As best shown in Fig. 2, the back flange, 5, is of greater circumference than the body portion, $7^b$, of the rim; and, therefore serves, not only as a centering device, but also as a positive stop which prevents the pushing of the rim off the wheel in the direction of the body of the motor vehicle (not shown).

In practice I make the space, 12, large enough to provide the necessary clearance between the rim, 7, and fixed rim; to-wit, that amount of clearance which permits the rim to be buttoned upon, and unbuttoned from, the wheel in the well-known manner. It will be understood that every pneumatic tire, 8, has a valve stem, 13, which passes through a valve stem hole, $7^d$, in the rim, and extends radially toward the center of the rim. In the illustrated case, the hole $7^d$ extends through the driving lug 10, on the rim. The fixed rim, 4, and the felly, 3, also contain a hole for the valve stem, 13. In mounting the rim and tire on the wheel, the valve stem, 13, is placed in this hole and then serves as a temporary hinge or pivot between the rim and the wheel so that the rim may be swung thereon, until that part of the rim corner, $7^c$, which is diametrically opposite the valve stem, rests against the conical seat 6 on the back-flange, 5. This operation of swinging the rim into position upon the wheel is known as the "buttoning-on" of the rim. The reverse operation is known as the "unbuttoning" of the rim. The annular space or clearance, 12, between the two rims should be sufficient to allow this "buttoning" and "unbuttoning" of the rim to be accomplished without special effort on the part of the user or operator.

When the rim is properly positioned with its corner, $7^c$, in circumferential contact with the complementary conical surface, 6, on the back flange, it is in condition to be secured in that position, and when so secured the assembled wheel, rim and tire are ready for use.

If, at the time of its concentric and perpendicular placement on the wheel, the two rims could be welded together along the corner, $7^c$, the rim would then be ideally centered and fixed on the wheel; but, as such welding together of the parts would deprive the rim of its essential demountability and is otherwise impractical, I have devised other means by which the demountable and fixed rims may be firmly united along that line and yet remain readily separable.

I wish to call special attention to the fact that if it were practical to thus weld the back flange and the rim together, the rim would need no other support or fastening. The pressure of the inflated pneumatic tire is distributed uniformly upon the rim which holds it, and the tire has no tendency to distort the rim. Adding to this, the fact that the cylindrical rim is sufficiently strong to sustain such support, I find that a single circumferential support for one edge of the cylindrical rim, 7, i. e., for the inside corner, $7^c$, thereof, is all that I require to hold the rim centrally on the wheel and prevent its axial movement thereon. It is of course necessary that the said single line of support shall be expressed, or made tangible, in metal of sufficient thickness to safely sustain the forces to which the connection is subjected in actual use.

The present invention is based on the foregoing conception and upon the discovery that a rim which is forced against and held solely upon the conical back flange, 5, needs no other radial support on the wheel; and every attempt to add to that support, as by the application of supporting means that radially distend the outer edge of the rim, results in the distortion of the rim in one direction or another, and in the loosening of its inner corner, 7ᶜ, upon the supporting flange or seat, 6. In other words, I find that the rim in itself, when made as shown, is capable of retaining its shape with respect to the tire, and that from an operating standpoint, it is both unnecessary and undesirable to fix the rim to the wheel on more than one circumferential line, as described.

By limiting the engagement of the two rims to the single line at one flange of the cylinder which composes the rim, and by positioning that line upon the conical back or stop flange, I have contrived an amply safe supporting and concentering connection, to which the rim may be buttoned and from which it may be disengaged with ease. But to make this practicable and effective, in the absence of an actual weld or like connection along the line of contact, 7ᶜ, 6, between the two rims, I find it necessary to provide positive means for holding the demountable rim 7 in place on the fixed rim 4. And again, to fulfil the requirements set out in the opening of this specification, I find it necessary to use means that insure the concentricity of the rim on the wheel at the moment preceding the fastening thereof by the holding means referred to.

For these purposes I employ a plurality of projections, 14, on the inner periphery 7ᵉ of the rim, in combination with a like plurality of bolt operated stop lugs, 15, on the wheel. As shown in Figs. 1, 2 & 3, the projections, 14, are circumferentially spaced on the inner surface 7ᵉ, midway between the edges of the rim. They may be riveted or welded to the rim, as thought best, or may be formed by punching down the metal. In whatever manner formed, each is distinguished by an outer end 14ᵃ, that forms a shoulder against which the stop lug 15 may act, as shown. The parts 14 are of less thickness, or radial width, than the clearance space 12. Therefore, when the rim is finally set or positioned on the conical back flange 5, the projections do not contact the body portion 4ᵃ of the fixed rim 4. Nevertheless they fit close enough to substantially insure the concentricity of the demountable rim on the wheel. In other words the projections, 14, constitute the means which I employ for concentering the rim and wheel, preparatory to fastening or locking the rim in place. For each part 14, there is a stop lug, 15. These lugs are identical throughout and a description of one will serve for all. As clearly shown in Figs. 1 and 3, the lug, 15, is of right angled form, having two arms, 15ᵃ, and 15ᵇ, reinforced by side flanges, 15ᶜ. The part 15ᵇ is the shank of the lug and contains a hole for the clamping bolt, 16. The head, 16′, of said bolt aids in fixing the rim, 4, on the felly, 3, and the stop lug, 15, is adjustably secured on the bolt by means of the nut, 16ᵃ, thereon. The arm, 15ᵃ, of the stop lug, is of less thickness than the clearance space, 12. It extends between the two rims and abuts the end or shoulder, 14ᵃ, of the projection, 14, on the demountable rim. I prefer that there shall be at least three of the projections, 14, and three stop lugs, 15, and generally employ five or more thereof, according to the diameter of the wheel. Six are shown on Fig. 1.

After buttoning the demountable rim on the wheel as described, the rim is secured by driving or setting home the stop or pressure lugs, 15. At that time, the lugs act against respective projections, 14, and drive the rim, 7, fixedly against and upon the conical back flange of the fixed rim. It will be observed that the action of the stop lugs is in lines paralleling the axis of the wheel and that in this manner the demountable rim is firmly secured on the wheel without disturbing the concentric relation of the parts and without in any manner radially distorting the demountable rim; that is, without throwing either the rim or the tire thereon out of round. If such radial movement were effected, the rim would be loosened on its supporting seat, 6, and rapid wear would result from the lost motion or looseness between the parts.

I prefer that my invention shall be embodied in demountable rims which are rolled from flat strip stock, and that the projections, 14, shall be formed thereon in one or the other of the ways hereinbefore suggested. Nevertheless, I wish it understood that my invention is not specifically limited to such uniform section rims; and therefore, have shown in Fig. 4, a demountable rim of hot rolled section; that is, one in which the centering and stop projection is formed on the body of the rim at the time the stock therefor is made. In this case, the projection, 14ˣ, takes the form of a circumferential rib on the inner periphery of the demountable rim, 7. The clearance, 12′, between the rib, 14ˣ, and the fixed rim, 4, should be somewhat greater than in the case of the spaced projections, 14, to allow the rim to button on the wheel freely. The arm, 15ᵃ, of the stop lug coacts with the rib, 14ˣ, in the same manner and with the same effect as is the case of the projection 14 of Fig. 3.

When desired, the projections may be placed nearer the outer edge of the rim. Such a construction is depicted in Fig. 5, wherein 14ʸ represents one of the fixed projections on the inner periphery on the demountable rim. This arrangement has the advantage that the projections, 14ʸ, may more nearly contact the fixed rim, 4. Being placed opposite the outer edge thereof, they do not materially interfere with the buttoning on of the demountable rim. The freedom of the rim is further insured by beveling the inner ends, 14$^z$, of the projections or studs. Where the projections, 14$^y$, are used, the form of the stop lug must be changed to correspond, and I prefer that the change shall consist in cutting away the stop arm of the lug, so that the stop lug, 15$^x$, takes on the form shown in Fig. 5. As there shown, the lug, 15$^x$, is a simple metal stamping, comprising a plate portion, 15$^w$, strengthened by the end flange, 15$^v$, and the side flanges, 15$^u$. The outer ends of the lugs, 15$^x$, act directly against the ends of the centering projections, 14$^y$.

By the means illustrated, I secure the demountable rim so rigidly upon the back flange of the fixed rim that, for the time being, the two parts act as though they constituted a single part, and as the rim transmits all thrusts directly to the wheel, through the medium of the back flange, the stop lugs, the bolts which carry them and the wheel felly, are relieved from the forces which would otherwise tend to drive them inward toward the center of the wheel.

Having thus described my invention, I claim as new and desire to secure by Letters Patent:—

A motor vehicle wheel having a fixed rim provided with a substantially conical back flange, in combination with a demountable, tire-carrying, integrally flanged rim, of enough greater circumference to allow it to be buttoned on to the fixed rim, and having an inner circumferential corner in substantially single-line conical contact with said back flange, an anticreeping device connecting the fixed and demountable rims, rim guiding and centering projections circumferentially spaced on the inner periphery of the demountable rim, said projections being proportioned and positioned to normally escape contact with the fixed rim, and means on the wheel acting directly against said projections to press the rim firmly upon said back flange without changing the normal circularity of the demountable rim, substantially as and for the purpose specified.

In testimony whereof, I have hereunto set my hand this 5th day of April, 1916.

ERLE KING BAKER.